United States Patent

Madsen et al.

[11] 3,713,341
[45] Jan. 30, 1973

[54] PRESSURE TRANSDUCER

[75] Inventors: Rud Frik Madsen; Jens Herman Jensen, both of Nakskov, Denmark

[73] Assignee: Aktiesefskabet De Danske Sukkerfabrikker, Copenhagen, Denmark

[22] Filed: May 3, 1971

[21] Appl. No.: 139,706

[30] Foreign Application Priority Data

May 4, 1970 Denmark..........................2249/70

[52] U.S. Cl..............................73/406, 128/2.05 D
[51] Int. Cl..................................G01l 7/08
[58] Field of Search........128/2.05 D, 2.05 E, 2.05 A, 128/2.05 R; 73/406, 408; 92/99, 100

[56] References Cited

UNITED STATES PATENTS

| 2,535,998 | 12/1950 | Bierman | 128/2.05 D |
| 69,894 | 10/1967 | Beardslee | 73/406 |

*Primary Examiner*—Donald O. Woodiel
*Attorney*—Watson, Cole, Grindle & Watson

[57] ABSTRACT

In a blood pressure transducer a pressure compartment is sealingly closed by a plane diaphragm sensing the pressure of a liquid flowing through said compartment via inlet and outlet means. The pressure sensed is transmitted to a measuring device via a pressure transfer element.

1 Claim, 3 Drawing Figures

PRESSURE TRANSDUCER

BACKGROUND OF THE INVENTION

The present invention relates to a pressure transducer for use in an apparatus for making pressure measurements in extracorporal liquid systems, more particularly the invention relates to a blood pressure transducer for use in a hemodialyzer, a heart and lung machine or in a blood irradiation apparatus, in which part or all of the blood passing through the heart per minute is passed through an external system. The pressure transducer is also suitable for making pressure measurements in enteral and parenteral liquid therapy since by measuring the pressure of the inflowing liquid the therapy can be monitored or controlled and since desired or undesired occurrences are detectable through pressure variations.

In these liquid systems, particularly in blood systems, the danger of cross infection of bacteria, virus etc. is present if the same equipment is used from one patient to the other. Since this equipment shall stand repeated cleaning and sterilization and must be non-toxic the production costs are high. Furthermore, the necessary manual cleaning and subsequent heat or chemical sterilization operations also make it expensive in use.

It is well known to make blood pressure measurements in extracorporal systems by means of pressure gauges with bourdon tubes and mercury columns and electrical pressure transducers. In such transducers the pressure force is transformed by inductive or capacitive means into an electrical signal. The connection between the blood system and the pressure measuring device is normally provided by way of a T-piece inserted into the tube or conduit system in which the blood flows. In the connecting piece between the T-piece and the pressure measuring device provision is normally made for the presence of an air inclusion such that the blood does not directly contact the pressure measuring device. The system suffers from the drawback that blood present in the connecting piece between the T-piece and the pressure measuring device very easily forms coagulums and in case of even a fine leak or moderate pressure increases, the connecting piece and the pressure compartment of the pressure measuring device may become fully or partially filled with blood which may imply a risk of coagulation of the blood and in any case necessitates cleaning.

SUMMARY OF THE INVENTION

According to the invention there is provided a pressure transducer of the kind referred to above comprising a housing having a plane diaphragm which sealingly closes a pressure compartment in said housing, a pressure transfer element cooperating with the side of said diaphragm remote of said pressure compartment, said housing being provided with inlet and outlet means permitting liquid flow through the pressure compartment.

When using the pressure transducer of the invention in a liquid system in which pressure variations are to be measured the liquid passes in a continuous flow into the inlet means through the pressure compartment and then out through the outlet means and back to the liquid system. The liquid pressure acts on the diaphragm which transfers the force to a mechanical or electrical measuring or monitoring device. Accordingly, the liquid only contacts the pressure transducer. Since all liquid flowing through an extracorporal circuit continuously passes through the pressure transducer in case of blood the risk of coagulations is eliminated.

In order to achieve a simple manufacture and assembling of the transducer the housing may consist of two interconnected members securing the diaphragm therein along the edge of the diaphragm to provide two separate compartments in the housing one of which being the pressure compartment.

The pressure transfer element provides a safe support to the diaphragm when the pressure transfer element is positioned centrally and loosely in the compartment on the opposite side of the diaphragm and carries a projection protruding through the appropriate housing member. Due to the safe support the diaphragm can be made very thin.

Furthermore, at least the parts of the device coming into contact with the liquid are made of plastic material whereby the transducer can be manufactured cheaply so that the economic hindrance of disposal of the device and the conduits after use is eliminated. Thus, a disposable equipment for liquid pressure measurement is provided in which resterilization of parts coming into contact with liquid is avoided. The transducer is advantageously designed so that it can easily be inserted into and separated from a special holder, e.g. in a dialysis apparatus. Moreover, the housing should be designed so that a liquid, e.g. blood, sensitive to mechanical influence is treated very carefully.

DESCRIPTION OF THE PREFERRED EMBODIMENT

Figure 1:
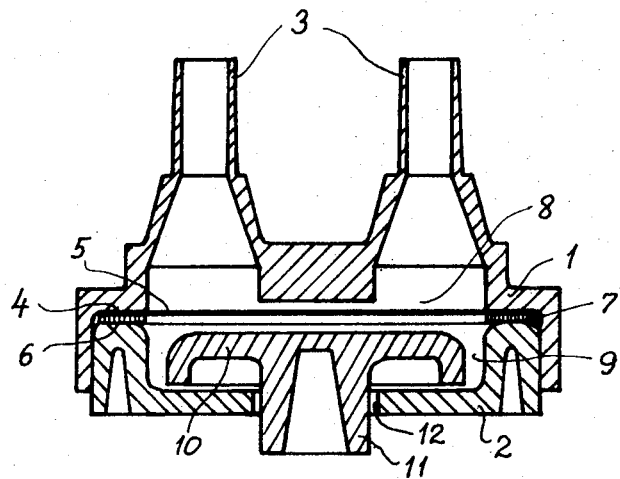
FIG. 1 shows a section taken along line II—II of FIG. 2 and showing an embodiment of the pressure transducer according to the invention.
Figure 2:
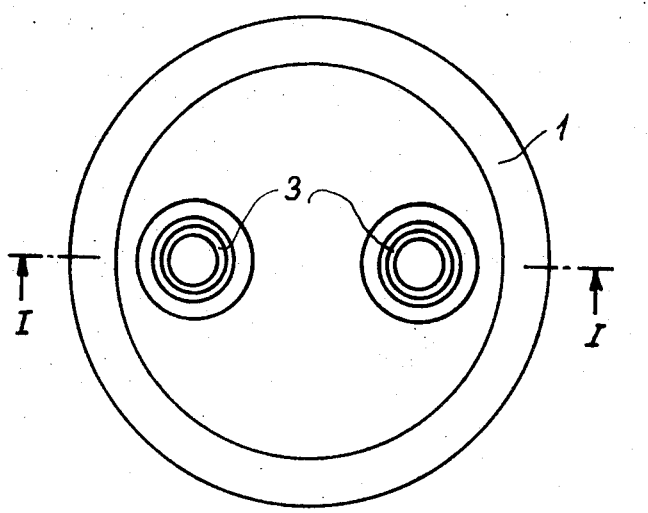
FIG. 2 shows the same seen from the conduit connection side.

In the drawings an upper part 1 together with a lower cover part 2 form a housing. The part 1 is provided with two conduit connecting pieces 3 leading to the interior of the housing. The upper part 1 has a surrounding shoulder 4 against which the edge of a thin plastic diaphragm 5 bears. The diaphragm is maintained sealingly along the edge by means of the lower part 2, said lower part having a contact surface 6 bearing against the edge of the diaphragm. To secure tightness along the edge of the diaphragm the shoulder 4 and the contact surface 5 is provided with small beads. Furthermore as shown on the drawings a packing ring 7 may be inserted to obtain increased tightness. The lower part 2 is maintained in the upper part by friction, gluing or welding.

The compartment in the upper part 1 closed by the diaphragm 2 constitutes a pressure compartment 8 through which in use the liquid is flowing, said liquid being introduced through one connecting piece 3 and is flowing out through the other connecting piece. On the other side of the diaphragm between the diaphragm and the lower part 2 another compartment 9 is provided. In this compartment a pressure transfer element 1o is positioned having a rather large surface facing the diaphragm. The element 1o has also a projection 11 protruding through a central opening 12 in the part 2. The projection 11 which in the embodiment shown is provided with a conical cavity serves to transfer the pressure to a mechanical or electrical pressure measuring and monitoring device.

In use in extracorporal blood treatment the pressure transfer device is inserted into a special holder on the blood treatment apparatus so that the projection 11 of the pressure transfer element by the pressure measuring apparatus is kept pressed into engagement with the diaphragm 5. Furthermore as mentioned above all the flow of blood taken out from the patient and passed to the treatment apparatus is passed into the pressure compartment through one connecting piece and out through the other connecting piece. Thus, a continuous flow is maintained through the pressure compartment 8 so that nowhere stagnant blood exists with the risk of coagulations resulting thereof. The pressure of the blood is transferred by the diaphragm 5 to the pressure transfer element 1o bearing against it, said element transferring the pressure to the measuring device via the projection 11.

Figure 3:
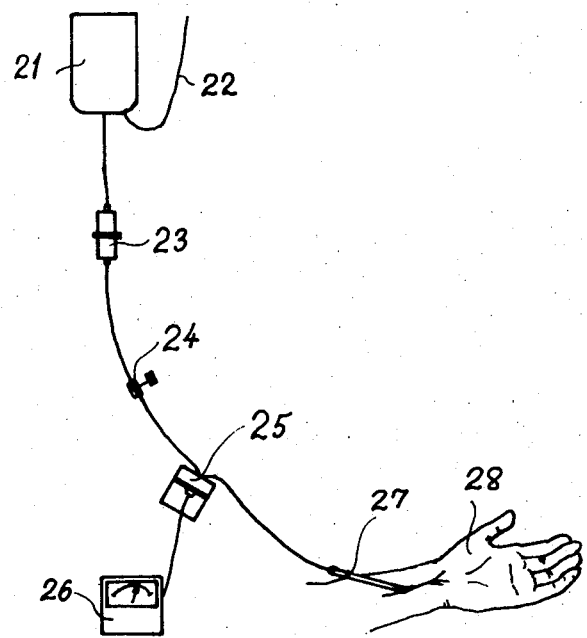
FIG. 3 shows the application of the pressure transducer in intravenous liquid infusion.

In use in enteral and parenteral liquid therapy the pressure transducer can be applied, e.g. as shown in FIG. 3, which illustrates the setup for intravenous liquid infusion. In an extremity subcutaneously running vein a needle 27 is inserted. Through this needle the liquid is injected into the patient's body from a container 21. Through an air conduit 22 the outflowing liquid is replaced by air. 23 indicates a drop chamber with constant liquid level and 24 is an adjustable restriction by which the infusion rate is controlled. 25 indicates the above described pressure transducer and 26 a mechanical or electronic control or measuring system. The pressure at the pressure transducer then for a specific adjustment of the restriction 24 will be dependent on the resistance in the injection needle. The apparatus 26 then can be arranged so as to give alarm if the resistance at the point of the needle is increased (e.g. if the blood coagulates around the point or the needle perforates the vascular wall and lies extravasculously) or if the drop chamber is emptied.

Advantageously all the parts of the device can be made of plastic material and the assembling is simple as the lower part 2 is just pressed into the upper part 1 after the flexible plate 5 and the pressure transfer element 1o have been positioned thereinto. The device therefore can be manufactured cheap. Furthermore, the mounting in the treatment apparatus panel is simple as the transducer shall just be inserted and secured thereto so that the projection 11 is in contact with and can transfer the force to the measuring device. Since the blood only contacts the transducer and the conduits connected thereto these can jointly be completed as a disposable equipment.

We claim:

1. A disposable blood pressure transducer useful in connection with the measurement of fluid pressure in an extracorporal dynamic liquid handling system, said transducer comprising:

a housing defining a pressure chamber, said housing including a pair of liquid connections communicating with the chamber for directing a continual flow of liquid into and out of the chamber and means defining a pressure transmission port communicating with said chamber;

a generally planar flexible diaphragm disposed across said port in liquid and pressure sealing relationship thereto, all portions of the housing and diaphragm in contact with said liquid being constructed of a synthetic plastic material;

a closure member engaging said diaphragm on the opposite side thereof from the chamber for maintaining the diaphragm in said fluid and pressure sealing relationship, said member defining a cavity opening toward the diaphragm and having an aperture opening away from the diaphragm; and a pressure transfer element having a portion thereof disposed within said cavity proximal the diaphragm and an elongated projection extending away from the diaphragm and through the aperture, said pressure transfer element being loosely mounted in the cavity for at least limited completely free movement toward and away from the diaphragm relative to the latter and to the closure member, said pressure chamber and said fluid connections presenting a substantially unimpeded path for flow of liquid therethrough in either direction across the diaphragm.

* * * * *